United States Patent

Morrison et al.

[15] 3,667,068
[45] May 30, 1972

[54] NUCLEAR CHARGED SELF-SUSTAINING LASER

[72] Inventors: Clyde A. Morrison, Wheaton; Donald E. Wortman, Rockville; Ruben T. Farrar, Wheaton, all of Md.

[73] Assignee: The United States of America as represented by the Secretary of the Army

[22] Filed: Aug. 17, 1970

[21] Appl. No.: 64,426

[52] U.S. Cl. ............................................. 331/94.5
[51] Int. Cl. ............................................. H01s 3/09
[58] Field of Search ................................. 331/94.5

[56] References Cited

UNITED STATES PATENTS

| | | | |
|---|---|---|---|
| 3,391,281 | 7/1968 | Eerkens | 331/94.5 X |
| 3,559,095 | 1/1971 | Nielson | 331/94.5 |
| 3,309,622 | 3/1967 | Weiner et al. | 331/94.5 |
| 3,470,490 | 9/1969 | Held et al. | 331/94.5 |

OTHER PUBLICATIONS

Derr et al., Radio Isotopes for Aerospace, ed. by Dempery et al., Plenum Press, New York, 1966, pp 309–312

Primary Examiner—Ronald L. Wibert
Assistant Examiner—Edward S. Bauer
Attorney—Harry M. Saragovitz, Edward J. Kelly, Herbert Berl and J. D. Edgerton

[57] ABSTRACT

A nuclear charged solid state laser for which no external power supply is required. A large class of single crystals are disclosed which contain a stable isotope that is potentially radioactive. The crystal is doped with a laser impurity ion and is irradiated with nuclear energy such that the stable isotope becomes radioactive to provide a pumping source for the laser impurity ions therein. Optical resonator means can be provided by coating both ends of the crystal with highly reflective surfaces. The radioactive isotope provides a continuous internal power supply over the lifetime of its decay, thus providing a potentially compact, portable and inexpensive solid state laser device.

13 Claims, 2 Drawing Figures

INVENTORS,
CLYDE A. MORRISON
DONALD E. WORTMAN
RUBEN T. FARRAR
BY
Harry M. Saragovitz
Edward J. Kelly
Herbert Berl
J. D. Edgerton
ATTORNEYS

NUCLEAR CHARGED SELF-SUSTAINING LASER

RIGHTS OF GOVERNMENT

The invention described herein may be manufactured, used, and licensed by or for the United States Government for governmental purposes without the payment to us of any royalty thereon.

BACKGROUND OF THE INVENTION

This information relates to lasers, and more particularly, to solid state lasers energized by nuclear radiation.

It is old in the art to provide a coherent light source or generator such as an artificial ruby crystal with an excitation source of pumping light such as a flash lamp. The size of the pumping energy source for such generators is limited unless it is contemplated to provide a permanent installation rather than a portable installation for a coherent light source. It would obviously be desirable if one could avail oneself of the large energy and power inherent in devices known as nuclear reactors rather than conventional energy sources derived from the conversion of water or coal power to electricity, as pointed out and disclosed in U.S. Pat. No. 3,470,490 to Held et al. The foregoing patent discloses the use of nuclear energy for effecting coherent light generation in which the ionizing radiation must first interact with a scintillating phosphor, and then have the output of said phosphor pump the laser material. The disadvantages and limitations inherent in this type of device include the requirement for an external nuclear reactor, the requirement for multiple energy transduction, and the requirement for overlapping radiation wavelength bands of the phosphor transducer and the laser material. Additionally, the size and cost of a suitable nuclear reactor to power the foregoing device severely limits its portability and use.

It is therefore a primary object of the present invention to provide a single crystal laser device, which is completely self-contained in that no external power supply is required for the operation of the laser.

Another object of the present invention is to provide a solid state laser device which contains a radioactive isotope that is directly utilized as a pumping source for laser impurity ions therein.

A further object of the present invention is to provide a nuclear charged solid state laser which can be made extremely small in size to provide a compact, portable, self-contained device.

SUMMARY OF THE INVENTION

Briefly, in accordance with the invention, a solid state laser device is provided which contains its own radioactive source of energy. A good optical quality material is doped with laser impurity ions and contains a stable isotope that is irradiated with nuclear energy such that the isotope becomes radioactive and provides a pumping source for the laser impurity ions. The material, which can be of a single crystal structure, will provide a laser output in accordance with the emission wavelength of the laser impurity ions that is proportional to the half-life of the radioactive isotope therein. The compactness in size with which the device can be constructed lends itself to a degree of portability that has been heretofore unachieved.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENTS

In the development of the device of the present invention one begins with a good optical quality material that is doped with laser impurity ions and contains a stable isotope that is potentially radioactive. An example of such a material, which is grown as a single crystal scheelite structure, is the compound lithium thulium flouride, $LiTmF_4$. This crystal can be grown doped with a small amount of neodymium, which has been observed to lase at 1.06 microns. Neodymium is but one of a number of rare earth ions which have exhibited laser action at various wavelengths and which can be grown in a crystal of the type envisioned in the device of the present invention. The stable isotope selected for the foregoing example is thulium, which occurs naturally as the single isotope thulium 169 and has a thermal neutron capture cross-section of approximately 125 barns. The cut and optically polished crystal is placed in a nuclear reactor, having a flux of approximately $10^{14}$ thermal neutrons/cm² sec., for a period of approximately a month. The thulium 169, by virtue of its large capture cross-section, tends to capture a neutron and becomes thulium 170 which is radioactive. The thulium 170 upon decaying via either of two branches by the emission of an electron becomes ytterbium 170 which is stable. This transition is accompanied by the emission of beta and gamma rays which are used, in turn, to pump the lasing material within the crystal. Emission of 84 kev gamma rays follows the thulium decay to an excited state of the ytterbium 170. Approximately 23 percent of the beta emission goes to this excited state with a half-life of $1.59 \times 10^{-9}$ sec. and about 77 percent of the beta decay goes to the ground state.

Figure 1:
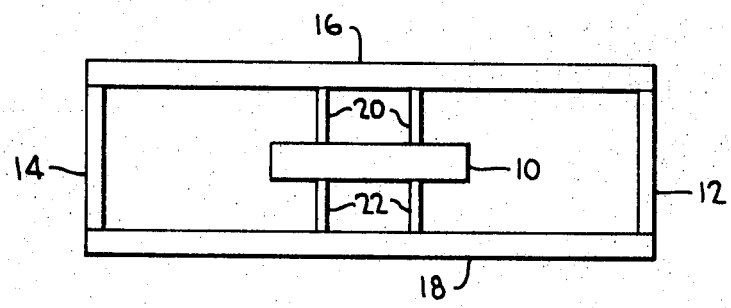
FIG. 1 illustrates a preferred embodiment of the device of the present invention mounted in an optical resonator.
Figure 2:
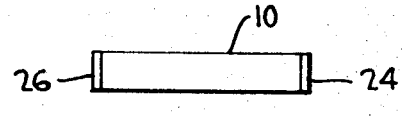
FIG. 2 illustrates another embodiment of the present invention in which the compactness and portability features are apparent.

The crystal is then removed from the reactor and placed in a suitable optical resonator as shown in FIG. 1. The fully charged crystal 10 is held in place by crystal supports 20 and 22. A partially reflecting mirror 12 and a totally reflecting mirror 14 are placed at opposite ends of crystal 10 and are held in place by mirror support members 16 and 18. The half-life of the radioactive thulium 170 is approximately 129 days which is ample time to transport the crystal from a reactor to a particular location where it is needed. The resultant laser structure is seen to be compact and portable, in that it requires no external power supply once it has been charged in the reactor. Alternatively, as seen in FIG. 2, the fully charged crystal 10 can be coated on its ends with a totally reflecting surface 26 and a partially reflecting surface 24 to provide an even more compact and portable unit. The finished device will lase continuously for a period of time proportional to the half-life of the radioactive isotope therein. It is understood that various external devices can be used to modulate the output of the laser in any desired manner. Some of the factors that influence the selection of a stable isotope to be utilized in the device of the present invention are that the isotope should have:

1. a large capture cross-section for thermal neutrons,
2. a long half-life decay, and
3. a nonlethal decay energy.

An obvious advantage of the device of the present invention is that its weight and size can be less than a conventional two-cell flashlight. In fact, the laser as shown in FIG. 2 can be made less than ½ inch in diameter and 1 inch long. Another advantage in utilizing the foregoing example is that the thulium 169 ion occurs 100 percent naturally and is thus quite inexpensive. It is also understood that in constructing the device of the present invention, one may work initially with the radioactive thulium 170 and grow a crystal that is the finished product, thus avoiding the need for placing the crystal in a nuclear reactor. While neodymium was specified as the laser impurity ion for the foregoing example, any rare earth ion can be utilized according to the desired laser wavelength output.

There exists many single crystal structures which will suffice as a good optical quality material for the device of the present invention. Among these are the vanadates, arsenates, phosphates, triflourides, tungstates, molibdates, and aluminates. Other crystalline structures that would prove useful are the scheelites, zircons, garnets, and monoclinically distorted scheelites. While the single crystal structure appears to be most advantageous, other noncrystalline substances may be utilized as the host material, such as glass. It is seen that we have provided a compact and portable self-sustaining laser in which no external power supply is required for its operation. The power for pumping the laser is supplied by an internal decay of a radioactive isotope. The radioactive isotope can be the same chemical element as the laser impurity ion.

We wish it to be understood that we do not desire to be limited to the exact details of construction shown and described, for obvious modifications will occur to a person skilled in the art.

We claim as our invention:

1. A nuclear charged self-sustaining laser, comprising:
   a. a single crystal material capable of transmitting coherent light;
   b. laser impurity ions located within said crystal, said ions comprising a rare earth;
   c. means for pumping said laser impurity ions, said pumping means comprising a constituent of said crystal, said constituent comprising thulium 169 which is irradiated with thermal neutrons, becoming thulium 170 which pumps said laser impurity ions by virtue of its radioactive decay to ytterbium 170; and
   d. an optical resonator for initiating and sustaining laser emission within said crystal.

2. The invention according to claim 1 wherein said single crystal is selected from the group consisting of vanadates, arsenates, phosphates, triflourides, tungstates, molibdates, and aluminates.

3. The invention according to claim 2 wherein said rare earth comprises neodymium.

4. The invention according to claim 1 wherein said single crystal is selected from the group consisting of scheelites, zircons, garnets and monoclinically distorted scheelites.

5. The invention according to claim 4 wherein said scheelite crystal comprises lithium thulium flouride.

6. The invention according to claim 5 wherein said rare earth comprises neodymium.

7. The invention according to claim 1 wherein said optical resonator comprises a highly reflective coating that is applied on both ends of said crystal.

8. The invention according to claim 1 wherein said optical resonator comprises a pair of highly reflective mirrors located at either end of said crystal.

9. A nuclear charged self-sustaining laser, comprising:
   a. a single crystal material capable of transmitting coherent light;
   b. laser impurity ions located within said crystal, said ions comprising a rare earth;
   c. means for pumping said laser impurity ions, said pumping means comprising a constituent of said crystal, said constituent comprising thulium 170 which pumps said laser impurity ions by virtue of its radioactive decay to ytterbium 170; and
   d. an optical resonator for initiating and sustaining laser emission within said crystal.

10. A method of fabricating a self-sustaining laser, comprising the steps of:
    a. providing a single crystal material capable of transmitting coherent light that is doped with rare earth laser impurity ions and has as a constituent thereof a stable isotope comprising thulium 169;
    b. cutting and polishing the ends of said material to create a rod of good laser quality;
    c. irradiating said material with thermal neutrons such that said thulium 169 becomes thulium 170 which provides a pumping source for said laser impurity ions by virtue of its radioactive decay to ytterbium 170; and
    d. providing said irradiated material with optical resonator means to initiate and sustain laser oscillation therein.

* * * * *